(12) United States Patent
Kerschbaum et al.

(10) Patent No.: US 8,015,080 B2
(45) Date of Patent: Sep. 6, 2011

(54) PRIVACY PRESERVING ARTIFICIAL IMMUNE SYSTEM

(75) Inventors: Florian Kerschbaum, Karlsruhe (DE); Nina Oertel, Mannheim (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 12/633,501

(22) Filed: Dec. 8, 2009

(65) Prior Publication Data
US 2011/0137800 A1 Jun. 9, 2011

(51) Int. Cl.
*G06Q 10/00* (2006.01)
(52) U.S. Cl. ...... 705/28; 705/7; 707/104.1; 340/539.13; 340/572.1; 713/170; 370/242
(58) Field of Classification Search .............. 705/28, 705/7; 340/539.13; 713/170
See application file for complete search history.

(56) References Cited

U.S. PATENT DOCUMENTS

| 7,392,199 | B2 * | 6/2008 | Karlov et al. ............... 705/2 |
| 2006/0052945 | A1 * | 3/2006 | Rabinowitz et al. ........... 702/20 |
| 2006/0090073 | A1 * | 4/2006 | Steinberg et al. ............ 713/170 |
| 2006/0138221 | A1 | 6/2006 | Swan et al. |
| 2007/0285235 | A1 * | 12/2007 | Vennelakanti et al. .... 340/572.1 |
| 2008/0109730 | A1 * | 5/2008 | Coffman et al. ............. 715/733 |
| 2009/0307032 | A1 * | 12/2009 | Tribe et al. ................. 705/7 |

FOREIGN PATENT DOCUMENTS

| EP | 1940074 A2 | 7/2008 |
| WO | 2008015457 A1 | 2/2008 |

OTHER PUBLICATIONS

Yao, A. C., "Protocols for Secure Computations", Proceedings of the 23rd Annual Symposium on Foundations of Computer Science, 1982, pp. 160-164.

Santos et al., "RFID in the supply chain: panacea or pandora's box?", Communications of the ACM, vol. 51, No. 10, Oct. 2008, pp. 127-131.

Yousuf et al., "A survey of RFID authentication protocols", Proceedings of the 22nd International Conference on Advanced Information Networking and Applications—Workshops, 2008, pp. 1346-1350.

Kerschbaum et al., "RFID-Based Supply Chain Partner Authentication and Key Agreement", Proceedings of the second ACM conference on Wireless network security, 2009, pp. 41-50.

(Continued)

*Primary Examiner* — Vanel Frenel
(74) *Attorney, Agent, or Firm* — Brake Hughes Bellermann LLP (57) ABSTRACT

Identifying anomalous products in a supply chain includes maintaining a set of anomalous patterns of events products in the supply chain. At least one of the anomalous patterns of events is transmitted to nodes of the supply chain. Messages are received from nodes at a third party and indicate whether an event of the product in the supply chain at the node matches an event in the anomalous pattern of events that has been transmitted to the node. Messages indicating that an event at the node matches an event in the anomalous pattern of events are securely encrypted, based on a key that is unknown to the third party, prior to transmission to the third party. A determination is made whether the product is an anomalous product, based on the messages from nodes indicating that a sequence of events occurring at one or more nodes matches a sequence of events in the anomalous pattern of events.

20 Claims, 5 Drawing Sheets

OTHER PUBLICATIONS

Ben-Or et al., "Completeness theorems for non-cryptographic fault-tolerant distributed computation", Proceedings of the twentieth annual ACM symposium on Theory of computing, 1988, pp. 1-10.
Du et al., "Secure multi-party computation problems and their applications: a review and open problems", Proceedings of New Scurity Paradigms Workshop, Sep. 11-13, 2001, pp. 11-20.
"EPCglobal Architecture Framework", EPCglobal Final Version 1.2, Sep. 10, 2007, 64 pages.
"Report on Community Customs Activities on Counterfeit and Piracy", European Commission—Taxation and Customs Union, 2008, pp. 1-21.
Flajolet et al., "Birthday paradox, coupon collectors, caching algorithms and self-organizing search", Discrete Applied Mathematics, vol. 39, No. 3, 1992, pp. 207-229.
Forrest et al., "Self-Nonself Discrimination in a Computer", Proceedings of the IEEE Symposium on Security and Privacy, 1994, 11 pages.
Goldreich et al., "How to Play Any Mental Game or a Completeness Theorem for Protocols with Honest Majority", Proceedings of the nineteenth annual ACM symposium on Theory of computing, 1987, pp. 218-229.
Hofmeyr et al., "Architecture for an Artificial Immune System", Evolutionary Computation, vol. 7, No. 1, 2000, pp. 45-68.
Juels, Ari, "Strengthening EPC tags against cloning", Proceedings of the 4th ACM workshop on Wireless security, Mar. 16, 2005, pp. 17 pages.
Juels, Ari, "RFID Security and Privacy: A Research Survey", IEEE Journal on Selected Areas in Communications, vol. 24, No. 2, Sep. 28, 2005, pp. 1-19.
Kerschbaum et al., "On the practical importance of communication complexity for secure multi-party computation protocols", Proceedings of the 2009 ACM symposium on Applied Computing, Mar. 8-12, 2009, 8 pages.
Kuerschner et al., "An analysis of data-on-tag concepts in manufacturing", Proceedings of the 3rd Konferenz Ubiquitare und Mobile Informationssysteme, 2008, pp. 122-135.
Lee et al., "A privacy-preserving interdomain audit framework", Proceedings of the 5th ACM workshop on Privacy in electronic society, Oct. 30, 2006, pp. 99-108.
Lehtonen et al., "How to Detect Cloned Tags in a Reliable Way from Incomplete RFID Traces", Proceedings of the IEEE RFID Conference, 2009, 8 pages.
Lehtonen, et al., "Securing RFID Systems by Detecting Tag Cloning", Proceedings of the 7th International Conference on Pervasive Computing, 2009, pp. 291-308.
Lehtonen et al., "Serialized TID Numbers—A Headache or a Blessing for RFID Crackers?", Proceedings of the IEEE RFID Conference, 2009, pp. 233-240.
Lincoln et al., "Privacy-Preserving Sharing and Correlation of Security Alerts", Proceedings of the USENIX Security Symposium, 2004, 16 pages.
Locasto et al., "Towards Collaborative Security and P2P Intrusion Detection", Proceedings of the IEEE Workshop on Information Assurance and Security, Jun. 15-17, 2005, pp. 30-36.
Mirowski et al., "Deckard: A System to Detect Change of RFID Tag Ownership", International Journal of Computer Science and Network Security, vol. 7, No. 7, Jul. 2007, pp. 89-98.
Narayanan et al., "Robust De-anonymization of Large Sparse Datasets", Proceedings of the IEEE Symposium on Security and Privacy, 2008, pp. 1-15.
Narayanan et al., "De-anonymizing Social Networks", Proceedings of the 30th IEEE Symposium on Security and Privacy, 2009, 19 pages.
Nochta et al., "Product Specific Security Features Based on RFID Technology", Proceedings of the Workshop on RFID and Extended Network—Deployment of Technologies and Applications, 2006, 8 pages.
Parekh et al., "Privacy-Preserving Payload-Based Correlation for Accurate Malicious Traffic Detection", Proceedings of the SIGCOMM workshop on Large-scale attack defense, 2006, 9 pages.
Porras et al., "Large Scale Collection and Sanitization of Network Security Data: Risks and Challenges", Proceedings of the New Security Paradigms Workshop, Sep. 19-22, 2006, 8 pages.
Sarma et al., "Radio frequency identification and the electronic product code", IEEE Micro, vol. 21, No. 6, 2001, pp. 50-54.
Staake et al., "Extending the EPC network—the potential of RFID in anti-counterfeiting", White Paper Series, Edition 1, Proceedings of the ACM symposium on Applied computing, 2005, pp. 1-11.
Valeur et al., "A Comprehensive Approach to Intrusion Detection Alert Correlation", IEEE Transactions on Dependable and Secure Computing, vol. 1, No. 3, Jul.-Sep. 2004, pp. 1-23.
Zanetti et al., "Privacy-preserving Clone Detection for RFID-enabled Supply Chains", IEEE International Conference on RFID, 2010, 8 pages.
Extended EP Search Report for EP Application No. 10013858.5, mailed Feb. 4, 2011, 8 pages.
Sun, et al, "An Artificial Immune System Architecture and Its Applications", IEICE Transactions on Fundamentals of Electronics, Communications and Computer Services, Engineering Sciences Society, vol. E86-A, No. 7, Jul. 2003, pp. 1858-1868.
Tuyls, "RFID-Tags for Anti-Counterfeiting", CT-RSA 2006, LNCS 3860, Jan. 13-17, 2006, pp. 115-131.

* cited by examiner

PRIVACY PRESERVING ARTIFICIAL IMMUNE SYSTEM

TECHNICAL FIELD

This description relates to the detection of anomalous patterns of sequences of events occurring to items in a network of nodes and, in particular, to privacy preserving artificial immune systems.

BACKGROUND

Radio Frequency Identification ("RFID") technology can be used to enable the tracking of individual products through a supply chain. For example, RFID tags with a unique identifier ("UID") may be attached to each item passing through the nodes of the supply chain, and the UID associated with an item may be captured at distinct read points within an organization (e.g., a company) handling the item. A suitable reading device can be used to read the UID, and a corresponding event associated with the reading of the UID can be stored in a local database of the organization. By default, each organization only has access to RFID event data that was captured by readers belonging to the organization. An event trace of an item can be defined as the time ordered set of events associated with its UID as the item associated with the UID passes through the supply chain. A local event trace can be defined as the set of events stored in one organization's database or known to one organization, and a global event trace for an item associated with a UID can be defined as the union of local event traces for the UID across a plurality of, or all, the databases of individual organizations. That is, a global event trace can include a trace of all events for the item, or at least a plurality of events that occur at more than one organization, as the item traverses the supply chain.

Analysis of an item's trace through a network of nodes in a supply chain can be used to detect unusual or anomalous patterns of events, which may be indicative of an anomalous or counterfeit product in the supply chain. Counterfeit products can lead to huge financial losses for legally run business. For example, European Customs seize millions of counterfeit articles per year, which can correspond to the loss of hundreds of millions of dollars of revenue for legitimate businesses.

RFID technology can be used to authenticate a product by its UID and has been previously proposed for preventing and detecting counterfeiting in a supply chain. One prevention approach using RFID technology is to use cryptographic authentication of an RFID tag attached to a product, which inhibits counterfeiters from cloning tags and using the cloned tags to pass counterfeit goods through the supply chain. One detection approach using RFID technology is based on analyzing event traces of a product having a UID.

Detection of counterfeit products in a supply chain using event traces can be characterized by two conflicting requirements. On the one hand, most counterfeit products cannot be detected based on the analysis of a local event trace, so effective detection of a counterfeit product requires analysis of global event traces. However, on the other hand, companies are generally reluctant to share their local event traces with competitors, or even with known business partners in the legitimate supply chain, because item-level event data reveals a wealth of information about a company's operations and may enable espionage on business volumes and partners. For example, a risk associated with sharing RFID event data with other organizations is that the other organizations may used the event date to discover valuable quantitative information about the organization the provided the event data, such as, for example, the organization's strategic relationships with other organizations, suppliers, customers, the organization's volume of items handled, and the organization's design of the distribution channels. Companies may fear being penalized for unfair or inefficient behavior that could be discovered from their local event data and may fear that their business secrets about future strategic products or process restructurings might be revealed by their local event data. Thus, organizations are looking for a way of reaping the benefits of counterfeit detection through the analysis of event traces for products in the supply chain, but while sharing at the same time as little information as possible to mitigate the associated risks.

SUMMARY

According to one general aspect, a computer-implemented method of identifying an anomalous product in a supply chain includes maintaining a set of anomalous patterns of events of a product in the supply chain and transmitting at least one of the anomalous patterns of events to nodes of the supply chain. Messages are received from nodes that have received the at least one pattern at a third party that is not a node of the supply chain. The messages indicate whether or not the occurrence of an event of the product in the supply chain at the node matches an event in the anomalous pattern of events that has been transmitted to the node. Messages indicating that an event at the node matches an event in the anomalous pattern of events are securely encrypted by the node prior to transmission to the third party, where the encryption is based on a key that is unknown to the third party. A determination is made whether the product is an anomalous product, where the determination is based on the messages from nodes indicating that a sequence of events occurring at one or more nodes matches a sequence of events in the anomalous pattern of events.

Implementations can include one or more of the following features. For example, the method can further include generating at least some of the patterns of events, where the generation of an anomalous pattern of events includes determining possible patterns of events of a product in the supply chain, comparing the possible patterns of events to a set of patterns that are known to be non-anomalous, and selecting possible patterns that do not match a pattern that is known to be non-anomalous for the set of anomalous patterns of events. A pattern of events in the supply chain can be determined to be a non-anomalous pattern of events by receiving, at the third party, messages from nodes of the supply chain indicating a pattern of an actual product in the supply chain, wherein the pattern is known to be non-anomalous. The messages can include information about an action performed on the product and the node that performs the action. Messages received from a node can be securely encrypted by applying a cryptographic hash function to information contained in the message, where the hash function uses a key known to each of the nodes of the supply chain, and the key used may not be known by the third party.

Messages indicating that an event at the node does not match an event in the anomalous pattern of events can contain random information. Messages received from a node indicating that the occurrence of an event of the product in the supply chain at the node matches an event in the anomalous pattern can include cryptographically encrypted information about the position of the event in a sequence of events for the product in the supply chain and about the position of the event in the anomalous pattern of events that has been transmitted to the node and unencrypted information about the position of the event in the anomalous pattern of events. The received messages indicating that the occurrence of an event of the product in the supply chain at the node matches an event in the anomalous pattern can be sorted by the information about the position of the event in the anomalous pattern of events, and it can be determined whether a combination of information from the sorted messages indicates that a sequence of events for the product in the supply chain matches the anomalous pattern of events.

The messages received from a node can include pairs of values, $\langle x_{\gamma,\delta}, \delta \rangle$ where:

$$x_{\gamma,\delta} = \begin{cases} f(h.\gamma.\delta, k) & \text{if } e_{\gamma+\delta}.\gamma = p.\gamma_{\delta+1} \wedge \delta < n-1 \\ -\sum_{i=0}^{n-2} f(h.\gamma.i, k) & \text{if } e_{\gamma+\delta}.\gamma = p.\gamma_{\delta+1} \wedge \delta = n-1, \\ r & \text{if } e_{\gamma+\delta}.\gamma \neq p.\gamma_{\delta+1} \end{cases}$$

n is the number of events in the anomalous pattern, p is the sequence of events in the anomalous pattern, e·y is an event of a type, y, observed at the node, h is a value of an identifier of the product, $\gamma$ is an index value for an event in a sequence of events for the product in the supply chain, $\gamma+\delta$ is an index value for an event that occurs in a sequence of events $\delta$ steps in the sequence after an event having an index value of $\gamma$, k is a key value that is unknown to the system, i is a summation index, f is a cryptographic function (e.g., a cryptographic hash function), and r is a random number in the domain of f. Then, determining whether the product is an anomalous product can include sorting received pairs of values by $\delta$ and determining whether a combination of $x_{\gamma,\delta}$ values corresponding to sequentially sorted $\delta$ values yields a non-random result. The product can include a tag that stores updatable information about the value of $\gamma$.

In another general aspect, a system for identifying an anomalous product in a supply chain includes a memory storing a set of anomalous patterns of events of a product in the supply chain, a transmission engine configured for transmitting at least one of the anomalous patterns of events to nodes of the supply chain, a message handler and a processor. The message handler is configured for receiving messages from nodes that have received the at least one pattern, where the messages indicate whether or not the occurrence of an event of the product in the supply chain at the node that sends a message matches an event in the anomalous pattern of events that has been transmitted to the node. Messages indicating that an event at the node matches an event in the anomalous pattern of events are securely encrypted prior to receipt by the message handler, where the encryption is based on a key that is unknown to the system. The processor is configured to determine that the product is an anomalous product, where the determination is based on the messages from nodes indicating that a sequence of events occurring at one or more nodes matches a sequence of events in the anomalous pattern of events.

Implementations can include one or more of the following features. For example, the received messages can be sorted by the information about the position of the event in the anomalous pattern of events, and then it can be determined whether a combination of information from the sorted messages indicates that a sequence of events for the product in the supply chain matches the anomalous pattern of events. The messages received from a node can include pairs of values, $\langle x_{\gamma,\delta}, \delta \rangle$ where:

$$x_{\gamma,\delta} = \begin{cases} f(h.\gamma.\delta, k) & \text{if } e_{\gamma+\delta}.\gamma = p.\gamma_{\delta+1} \wedge \delta < n-1 \\ -\sum_{i=0}^{n-2} f(h.\gamma.i, k) & \text{if } e_{\gamma+\delta}.\gamma = p.\gamma_{\delta+1} \wedge \delta = n-1, \\ r & \text{if } e_{\gamma+\delta}.\gamma \neq p.\gamma_{\delta+1} \end{cases}$$

n is the number of events in the anomalous pattern, p is the sequence of events in the anomalous pattern, e·y is an event of a type, y, observed at the node, h is a value of an identifier of the product, $\gamma$ is an index value for an event in a sequence of events for the product in the supply chain, $\gamma+\delta$ is an index value for an event that occurs in a sequence of events $\delta$ steps in the sequence after an event having an index value of $\gamma$, k is a key value that is unknown to the system, i is a summation index, f is a cryptographic function (e.g., cryptographic hash function), and r is a random number in the domain of f.

The processor can be further configured to determine whether the product is an anomalous product based on the messages from nodes indicating that an event at the node matches an event in the anomalous pattern of events by sorting received pairs of values by $\delta$, and determining whether a combination of $x_{\gamma,\delta}$ values corresponding to sequentially sorted $\delta$ values yields a non-random result.

In another general aspect, a system for identifying an anomalous pattern in a network of nodes includes a memory storing a set of anomalous patterns of events in the network of nodes, a transmission engine configured for transmitting at least one of the anomalous patterns of events to nodes of the network of nodes, a message handler, and a processor. The message handler is configured for receiving messages from each of the nodes at a third party that is not a node of the network. The messages indicate whether or not the occurrence of an event in the network at the node matches an event in the anomalous pattern that has been transmitted to the node. Messages that indicate that an event at the node matches an event in the anomalous pattern of events are securely encrypted by the node prior to receipt by the message handler, where the encryption is based on a key that is unknown to the system. In particular, the messages received from a node including pairs of values, $\langle x_{\gamma,\delta}, \delta \rangle$ where:

$$x_{\gamma,\delta} = \begin{cases} f(h.\gamma.\delta, k) & \text{if } e_{\gamma+\delta}.\gamma = p.\gamma_{\delta+1} \wedge \delta < n-1 \\ -\sum_{i=0}^{n-2} f(h.\gamma.i, k) & \text{if } e_{\gamma+\delta}.\gamma = p.\gamma_{\delta+1} \wedge \delta = n-1, \\ r & \text{if } e_{\gamma+\delta}.\gamma \neq p.\gamma_{\delta+1} \end{cases}$$

n is the number of events in the anomalous pattern, p is the sequence of events in the anomalous pattern, e·y is an event of a type, y, observed at the node, h is a value of an identifier of the sequence of events, $\gamma$ is an index value for an event in a sequence of events in the network of nodes, $\gamma+\delta$ is an index value for an event that occurs in a sequence of events $\delta$ steps in the sequence after an event having an index value of $\gamma$, k is a key value that is unknown to the system, i is a summation index, f is a cryptographic function, and r is a random number in the domain of f. The processor is configured to identify an anomalous pattern of events in the network, where the determination is based on the messages from nodes indicating that a sequence of events occurring at one or more nodes matches a sequence of events in the anomalous pattern of events.

Implementations can include the processor being further configured sort received pairs of values by $\delta$ and determine whether a combination of $x_{\gamma,\delta}$ values corresponding to sequentially sorted δ values yields a non-random result.

The details of one or more implementations are set forth in the accompanying drawings and the description below. Other features will be apparent from the description and drawings, and from the claims.

DETAILED DESCRIPTION

This document describes systems and techniques for detecting an anomalous pattern of events for an item in a network of nodes and, more particularly, for identifying an anomalous product in a supply chain. The systems and techniques described herein for such detection of the anomalous pattern of events and for the identification of an anomalous product in the supply chain preserve the privacy of information known locally to each of the nodes in the network of nodes (e.g., in the supply chain). Before describing details on the detection systems and techniques, we first examine the theory behind the idea of using trace analysis to detect counterfeit items in a supply chain.

Counterfeiters can use a variety of different approaches and techniques for introducing counterfeit items into the supply chain, and the different approaches have different consequences global traces of a product that are observed in a supply chain. For example, when all items of a certain type are equipped with UIDs (e.g., when the items are equipped with an RFID tag) and a tracking infrastructure covering the supply chain is in place, then the first challenge for the counterfeiter is to obtain a UID for the counterfeited goods that he seeks to introduce into the supply chain. One option for the counterfeiter is to put no identifier at all on the counterfeit item, but this strategy is easily detectable during authentication. For example, a condition for allowing an item to propagate through the supply chain may be that the item must have a valid UID, and if the item does not have a UID, then the item may be flagged as a counterfeit item.

For a counterfeiter to actually obtain a UID, the options include guessing random numbers, transferring valid UIDs taken from a genuine product to a counterfeit item, or copying the UIDs found on genuine products. When attempting to transfer UIDs, counterfeiters may remove (i.e., steal) RFID tags from genuine items and reapply the tags to counterfeit items, or the counterfeiter may seek access to UIDs of disposed products and reuse then attempt to the UIDs of the disposed products. As a consequence, the UID on a counterfeit product either will be duplicated (e.g., in the case of copying a UID) or will be truly unique (e.g., in the case of transferring a tag from an authentic product to a counterfeit item, or (usually) in the case of guessing a UID value). Furthermore, the UID will either be valid when the counterfeiter copies a UID from a genuine product to a counterfeit item, meaning that a genuine item carrying the same UID exists, or the UID will be invalid (e.g., when the counterfeiter guesses a UID that can be used on a counterfeit item). Any UID found on a counterfeit item therefore is either invalid, has been transferred from a genuine item, or has been duplicated.

Besides obtaining UIDs for counterfeit goods, a counterfeiter must distribute the counterfeit items and put them on the market, choosing a suitable location and time to inject the counterfeit goods into the supply chain. Counterfeits can be distributed through illicit supply chains or injected into valid supply chains. Examples of illicit distribution are the smuggling of goods through customs and the sale on flea markets. Selling counterfeits in online shops is another increasingly popular distribution strategy. Counterfeiters also may misuse an authentic supply chain, sometimes mixing counterfeit items with genuine products to better disguise the counterfeits. To trace of counterfeit items in the supply chain it is relevant whether the chosen channels for distributing the counterfeit items are visible, i.e. whether readers are deployed to read UIDs on products in the supply chain and to capture item movements, or whether the channels are invisible. Illicit distribution channels are likely to contain no read points and thus to be invisible, while valid channels can be assumed to be visible.

In the case of a counterfeit item that carries a transferred UID (i.e., a UID that is valid and unique), the events in the event trace for the counterfeit item are triggered by the movements of: (1) the genuine item until its UID is removed and transferred to the counterfeit item; and (2) by the counterfeit item that carries the stolen and transferred UID. Up to the transfer point, the trace will be the trace of a genuine item. When the counterfeit is re-injected into the valid supply chain after the stolen UID has been added to the counterfeit item, the sequence of events will only be valid if the counterfeit directly replaces a genuine item, such that the trace of events is identical to the trace that would exist for the genuine item. For example, if a UID were taken from a genuine item sitting on a pallet on a loading docket and transferred to a counterfeit good, and then the counterfeit good were swapped with the genuine item on the pallet, the subsequent trace for the counterfeit good would be indistinguishable from the subsequent trace that would exist for the genuine item.

Figure 1A:
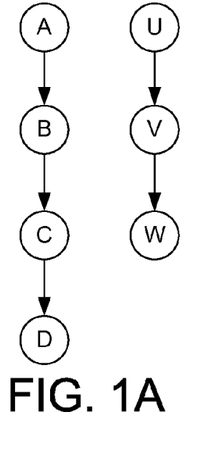
FIGS. 1A, 1B, 1C, 1D, 1E, and 1F are schematic diagrams of traces of an item in a network of nodes.
Figure 1B:
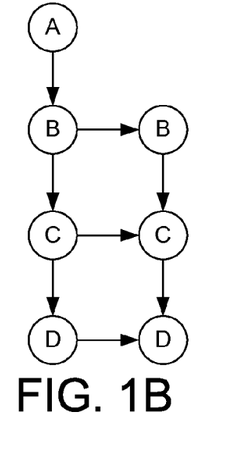

However, if after the transfer of the UID from the genuine item to the counterfeit item, the counterfeit item were injected at a different position in the supply chain, then the trace of the counterfeit item would be different from the trace of the genuine item. For example, FIG. 1A is a schematic diagram of a traces of genuine items in a network of nodes and FIGS. 1B, 1C, 1D, 1E, and 1F are schematic diagrams of traces of an item in a network of nodes, which differ from the trace in FIG. 1A. In FIG. 1A a genuine item has a trace of events A, B, C, D, and another genuine item has a trace of events U, V, W. As shown in FIG. 1B, if a UID is stolen from a genuine item after event C and transferred to a counterfeit good and then the counterfeit good is injected further upstream in the supply chain (e.g., at "B") then the trace for the counterfeit item in FIG. 1B is different than the trace for the genuine item in FIG. 1A. The resulting trace for the counterfeit item shown in FIG. 1B contains transitions that are forbidden for genuine items (e.g., the transition B→B in FIG. 1B).

Figure 1C:
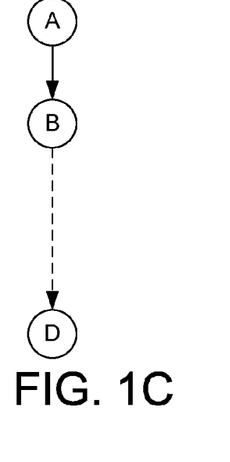
Figure 1D:
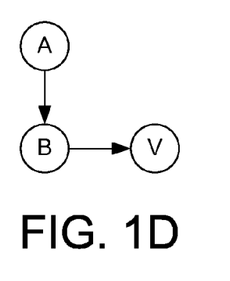

Similarly, if a UID is stolen from a genuine item after event B and transferred to a counterfeit good and then the counterfeit good is injected further downstream in the supply chain (e.g., at "D") then the trace for the counterfeit item in FIG. 1C is different than the trace for the genuine item in FIG. 1A. If a UID is stolen from a genuine item after event B and transferred to a counterfeit good and then the counterfeit good is injected in another branch of the supply chain (e.g., at "V")

then the trace for the counterfeit item in FIG. 1D is different than the trace for the genuine item in FIG. 1A.

Figure 1E:
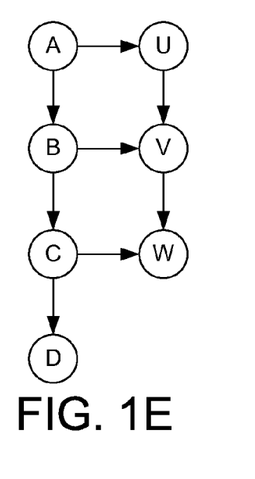
Figure 1F:
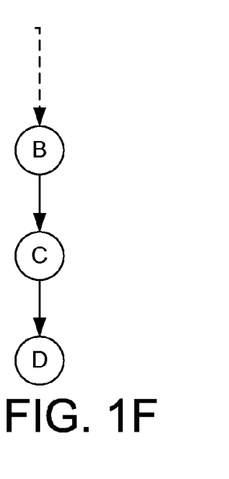

If a counterfeit item with a duplicate UID is injected into the supply chain, the trace that is retrieved for the UID of the counterfeit item is a mix of all sub-traces created by the multiple items carrying the same UID (e.g., as shown in FIG. 1E). If items with duplicate UIDs are injected in the supply chain, this will result in an invalid global trace that contains transitions between events created for different items, even though the genuine and the counterfeit items carry the same UID. For example, let event A be triggered by a genuine item, and let it be followed by an event U, triggered by a counterfeit item with a copied UID. The resulting transition from A→U is indicative of a counterfeit because that transition is not allowed for genuine items, because a genuine item would not travel on that path.

If counterfeits with guessed (i.e. invalid, but unique, UIDs) are injected in the supply chain, the trace for such a counterfeit will be incomplete unless the counterfeiter manages to inject the counterfeit at the first node of the supply chain. In all other cases, the trace for the counterfeit item will start with an invalid first event, e.g., event B shown in FIG. 1F, which is not allowed for genuine items, as they need to originate at the correct first node (e.g., at an authorized producer).

Thus, to detect anomalous items (e.g., counterfeits) in a supply chain we can compare actual traces for an item to traces that are known to be anomalous or non-anomalous. This approach is based on artificial immune systems (AIS), which are a type of an anomaly-based detection algorithm. In an analogy to the operation of the biological immune systems, an AIS can detect anomalies based on matching patterns, which may be known as antigens. In our approach, the antigens represent the structure of invalid (i.e., anomalous) traces (e.g., traces that a counterfeit or otherwise anomalous item would traverse in the supply chain). Finding a match between an antigen and an item trace means that the trace is invalid and most probably belongs to a counterfeit item. Before discussing privacy-preserving techniques for comparing an antigen pattern to an event trace of an actual item, we first discuss the generation of antigen patterns.

The general process of creating antigens can include randomly creating antigens of a fixed pattern length n, which correspond to a pattern of n events for an item in the supply chain, and then comparing the randomly created antigen to a set of actual event traces, called the clean self set, which only contains traces of genuine products that have been observed to propagate legitimately through the supply chain and which should cover every possible legitimate path in the supply chain. The traces of genuine products that have been observed to propagate through the supply chain may be gathered from data that nodes of the supply chain (e.g., different companies or organizations) agree to share for purposes of generating the antigen set.

If a randomly created antigen matches any trace in the clean self set, it dies and is discarded. It is thus ensured that no antigen matching the trace of a genuine product is retained, and false alarms (e.g., a genuine item wrongfully classified as counterfeit) are thereby prevented. If the randomly created antigen does not match any trace in the clean self set, it becomes mature and active and is used in the detection phase to compare to possibly counterfeit traces. If, during the detection phase (described below), the antigen does not match any trace within a fixed number of attempts, which may be known as the lifetime of the antigen, it also may die, but a replacement can be generated. It is thus ensured that only relevant antigens are maintained. If the size of the protected supply chain is sufficiently small, as it is in many real-world cases, this step can be omitted, because the size of the set of all mature and active antigens will then be small enough to be kept entirely. If an antigen does match an observed pattern during the detection phase during the lifetime of the antigen, and a potential counterfeit is thus detected, the match can be checked and subsequently either confirmed or rejected by a human administrator. This process is called co-stimulation. If the match corresponds to a counterfeit and the antigen is therefore co-stimulated, it can be stored in memory so that it never dies. Otherwise, if the human checker determines that the match indicates a false positive then the antigen dies immediately, which ensures that the pattern corresponding to the false positive is added to the clean self test.

Figure 2:
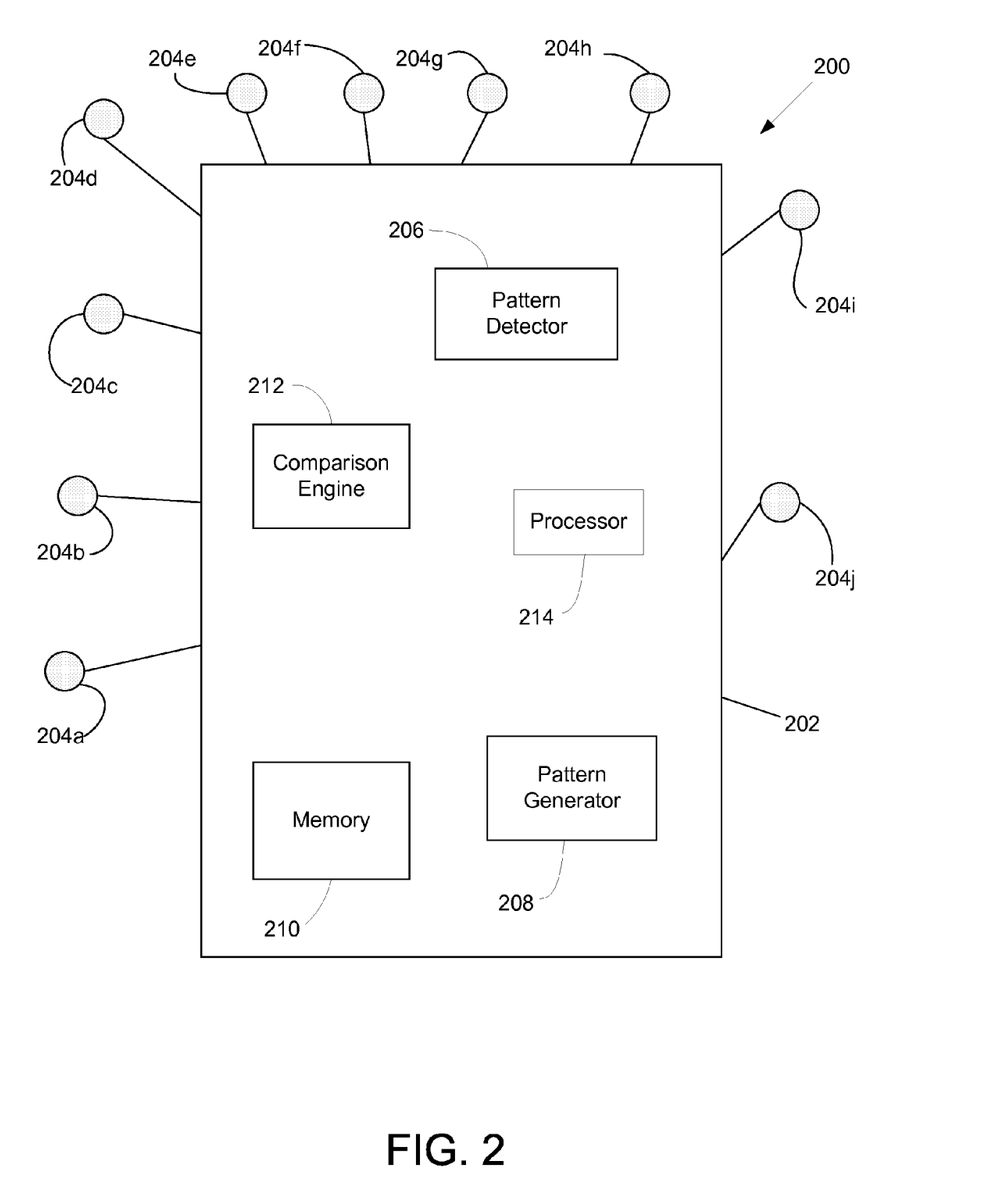
FIG. 2 is a schematic block diagram of a system configured to generate antigens for an artificial immune system.

FIG. 2 is a schematic block diagram of a data-processing system 200 configured to generate antigens for an artificial immune system. An antigen generator 202 is coupled to a plurality of nodes 204a-204j in of the supply chain. The nodes 204a-204j can transmit messages about events of an item that occur at the node (i.e., the local event trace for the node) to the antigen generator, so that the antigen generator can determine a global trace for the item by merging multiple local event traces for the item received from a plurality of nodes. For example, a pattern detector 206 can receive the messages from multiple nodes relating to a particular item and order the events described by the messages to determine a global event trace for the item. The events could be ordered chronologically by timestamp information contained in the messages or by an index for indicating a position of the event in the item's passage through the supply chain. For example, an RFID tag attached to the item may store an index value that this incremented each time a read event occurs to the tag or each time the tag is read at a different organization, and the value of the index can be transmitted with the message corresponding to the event. When the messages sent by the nodes 204a-204j are known to correspond to a genuine item that propagates through the supply chain with a trace that is known, defined, or determined to be non-anomalous, then the trace for the item that is determined by the pattern detector can be added to the traces in the clean self test.

A pattern generator 208 can generate a set of possible antigens as described above, which may be stored in a memory 210, and then compared by a comparison engine 212 to detected non-anomalous patterns of events that have been determined by the pattern detector 206 (i.e., patterns of the clean self test). Antigens that do not match any detected patterns can be stored in the memory 210 and then used during the detection phase. Although global event traces for items in a supply chain may consist of many events (e.g., tens, or event hundreds, of events), antigens can be quite short (e.g., just two events). This can be understood by considering that an expensive watch may undergo many steps, and corresponding read events, in a legitimate supply chain (e.g., manufacturer→>shipper 1→warehouser→shipper 2→exporter→customs agent 1→shipper 3→customs agent 2→importer→shipper 4→wholesaler→shipper 5→retailer warehouse→retailer storefront), while an antigen may consist of the anomalous pattern of the sequence of events shipper 2→retailer warehouse. The sequence of events of the watch moving from shipper 2 to retailer warehouse, without any of the intermediate events, is enough to detect an anomalous pattern and therefore a counterfeit watch.

As described in more detail below, the parameters of the system can be tuned in many real-world supply chains, such that a complete specification of the supply chain in the mature antigens can be achieved. By complete specification it is meant that the antigens cover every possible deviation from valid traces of items in the supply chain and contain no pattern matching the legitimate supply chain. This allows the generation of antigens and comparison of the antigens to the clean self set entirely before the detection process, since no lifecycle steps, such as antigen lifetime or co-stimulation, for antigens need to be performed during detection.

Using this approach of complete specification of the supply chain, the AIS detection algorithm can rise from an anomaly-based detection approach to a specification-based approach, with the difference being that the specification is learned and does not need to be manually maintained.

If the supply chain cannot be completely specified or it is impractical to completely specify the supply chain, the process of co-stimulation can be used to reduce the set of antigens used for detection. Assuming the strategies of the counterfeiters are somewhat stable and each strategy produces a unique pattern, the evolution of the set of antigens will eventually produce the antigen that matches that pattern. For example, if b antigens completely specify the supply chain, then if the set of active and mature antigens contains a fraction $\alpha$, ($0<\alpha<1$), of those b antigens and the lifetime of an antigen is $\phi$ comparisons, then the expected number of comparisons $\eta$ until a particular counterfeiter strategy is detected is $$\eta = \frac{\phi}{\alpha}.$$

If a counterfeiter strategy is stable for more than $\eta$ comparisons (or items, if each item is checked), then the strategy likely will be detected. Once a counterfeit item has been detected, co-stimulation can ensure that the matching antigen is committed to memory and the counterfeiter strategy is thwarted forever.

Of course, a global event trace for an item identified by a UID that passes through the supply chain is distributed among a number of companies or organizations, and in general it is difficult for any one company or organization to detect most counterfeits by itself. Before describing details of the process of detecting a counterfeit item based on a comparison if the item's global event trace to the set of antigens, a review of some relevant nomenclature is useful.

When a UID for an item in the supply chain is read, a message corresponding to the read event can be generated, where the message for the read event can be a tuple contains the information, ⟨organization o, timestamp s, tag identifier h, type y⟩, plus a number of type-dependent fields. When a party (e.g., a node in the chain, such as a company or organization) $X_k$ processes an item with an attached tag having a UID id, the party creates a read event e with o=$X_k$ and s=current time and h=id (plus the corresponding type and type-dependent fields). As the item is forwarded along the supply chain, different parties can create read events for the item and its associated tag. An event trace t of for the item associated with the UID then consists of all read events $e_j$ (j=1, . . . , m) distributed across l parties $X_k$, i.e. it is a join over the distributed event database.

Antigens need to be compared to the global event trace t of the item (or at least a portion of the global event trace) although any two consecutive events $e_i$ and $e_{i+1}$ can be distributed over two parties. For this purpose a third-party anti-counterfeiting service provider S, which is not a node in the supply chain, can be used to collect the local event traces from nodes of the supply chain, generate a global event trace for the item t, and then to perform the comparison of the antigens with the global event trace of the item.

S can first generate the set of mature and active antigens based on a jointly chosen, public clean (i.e. counterfeit free) self set of traces. Alternatively, the set of mature and active antigens can be provided to S. During the detection phase, S receives a request for checking an item for its authenticity. If S is requested to check an item with UID h (e.g. because it shall be sold in a store or it is currently being processed by customs) S can distribute the set of mature and active antigens along with the tag identifier h to all supply chain nodes $X_k$. Alternatively, S can distribute the set of antigens to a subset of the nodes $X_k$ where the presence a counterfeit might be expected to be detected. Afterwards S collects response messages from the nodes, where the combination of messages from different nodes is used to determine whether an event trace for item that spans more than one node matches an antigen pattern. If a match is found, S notifies all parties of a possible counterfeit and appropriate investigations are initiated to verify the claim. In case the supply chain is not completely specified, S also can manage the other tasks in the lifecycle of an antigen, such as co-stimulation or death of an antigen.

As described in more detail below, techniques are disclosed that allow preserving the privacy of local read event data of the nodes of the supply chain while still being able to detect counterfeit items. With the techniques described herein, neither the anti-counterfeiting service provider S nor any other node $X_k$ may learn whether a node X. has a read event for UID h, if the event trace of h does not match any antigen pattern, while the antigen patterns may be known to any legitimate party $X_k$ of the supply chain (and S of course).

The basic operation in an AIS is to compare whether an antigen pattern p matches a global event trace t. As described above, the event traces t are distributed among l parties $X_k$ (k=1, . . . , l), and an event trace t of an RFID tag consists of a variable number of read events $e_j$ (j=1, . . . , m). For now, we assume that each party $X_k$ is aware of the numbering of its read events, i.e. each party knows the j value(s) of its read event(s) $e_j$. This may be achieved by storing an index value of read events on the tag. For example, as described above, an RFID tag attached to the item may store an index value that this incremented each time a read event occurs to the tag or each time that the tag is read at a new party, so that when the tag arrives at the party $X_k$, the party can read from the tag the highest value of j that has been read for the tag so far.

Recall that a read event can be a tuple consisting of ⟨organization o, timestamp s, tag identifier h, type y⟩ plus a number of type-dependent fields. An event type can correspond to the action performed with the item, e.g. shipping, receiving, packing, unpacking or assembling. In one implementation, the organization identifier can be chosen as the event type.

A pattern p is a sequence of n event of types $y_i$ (i=1, . . . , n), and a pattern p matches an event trace t of an RFID tag, if there are n consecutive read events $e_j$ of that UID, such that $e_j.y=p.y_i$ (j=$\beta$, . . . , $\beta$+n−1, i=1, . . . , n) (where c.f denotes access to the field f of c). The basic operation of comparing a pattern p to an event trace t occurs in the detection phase of an AIS when new event traces need to be checked against the mature and active antigens for matches indicating counterfeits.

To compare a pattern p against a single event trace t of a specific UID while protecting the privacy (confidentiality) of the local read events, such that the companies do not have to share their event data, the information transmitted from the nodes to the third party S in a message can be cryptographically encoded to prevent knowledge of the particular information in the message.

For example, a message authentication code MAC(·,key) with a key key can be used to provide the cryptographic encoding of the messages. The secret key can known to all participating nodes of the supply chain (e.g. companies $X_k$), but not to the anti-counterfeiting service provider S. The message authentication function is secure against MAC forgery, i.e. for given pairs $m_j$,MAC($m_j$,key) it is virtually impossible to determine MAC(m,key) for any $m \neq m_j$. This implies pre-image resistance as in common cryptographic hash functions.

Then, for an antigen pattern having a length n, the anti-counterfeiting service provider S can send the antigen pattern p and the tag identifier h to each participating node of the supply chain $X_k$, which looks up its read events $e_j$ for an RFID tag h (i.e., the read events that occur at the node for the item with the tag h). If $J_k$ is the set of found read event numbers at $X_k$, then for each position in the trace $\gamma \notin \{\min(j|j \notin J_k) - n+1, \ldots, \max(j|j \notin J_k)\}$ and each corresponding $\delta \notin \{i | 0 \leq i < n \wedge \gamma + i \notin J_k\}$ $X_k$ can compute $x_{\gamma,\delta}$, where $$x_{\gamma,\delta} = \begin{cases} MAC(h.\gamma.\delta, k) & \text{if } e_{\gamma+\delta}.\gamma = p.\gamma_{\delta+1} \wedge \delta < n-1 \\ -\sum_{i=0}^{n-2} MAC(h.\gamma.i, k) & \text{if } e_{\gamma+\delta}.\gamma = p.\gamma_{\delta+1} \wedge \delta = n-1 \\ r & \text{if } e_{\gamma+\delta}.\gamma \neq p.\gamma_{\delta+1} \end{cases}$$

such that a sum of a sequence of $x_{\gamma,\delta}$ values adds up to 0 (or another non-random value) if the trace for the tag matches the pattern p. In case of any event type mismatch between a read event $e_j$ and an event in the pattern (i.e., where $e_{\gamma+\delta} \cdot y \neq p \cdot y_{\delta+1}$), $X_k$ chooses a random number in the domain of the message authentication code for $x_{\gamma,\delta}$ and the result of the summation at S is also random.

$X_k$ sends to S a random permutation of its set of pairs $\langle x_{\gamma,\delta}, \delta \rangle$. Note that if events at one party are consecutive there are $n|J_k|$ such pairs, i.e. the number of read events a company has would be revealed. To conceal information that a node has no events for a particular UID (i.e., RFID tag) the node can send r'·n random pairs of random numbers to S. To conceal the number of events, all parties must agree on an upper bound u and always send u·n pairs (padded with random numbers). For example, when n=2 and u=1, each party $X_k$ can send two pairs for each detection request by S in order to not reveal which parties had possession of the item.

Figure 3:
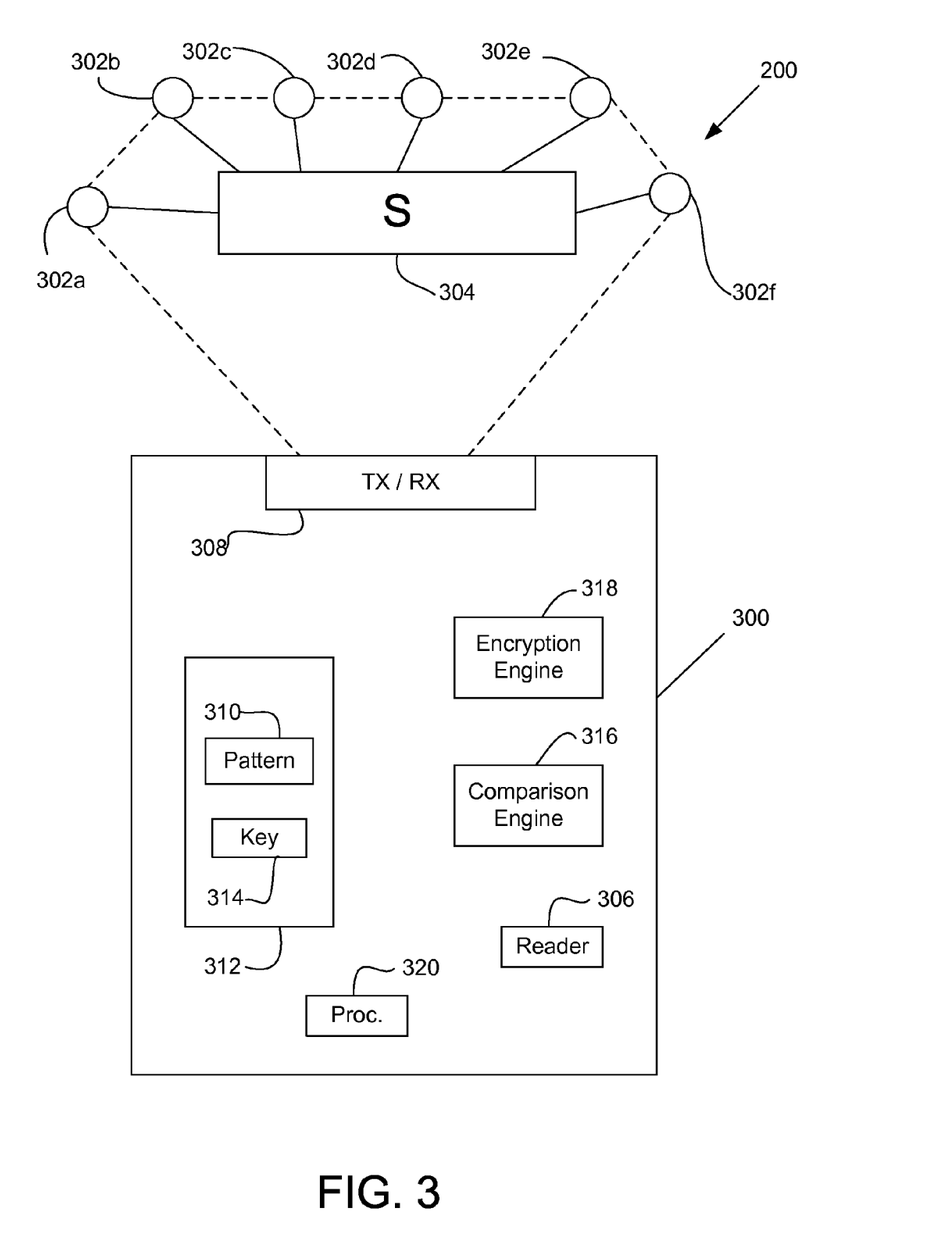
FIG. 3 is a schematic block diagram of a node of a network of nodes in communication with a trusted third party.

Thus, FIG. 3 is a schematic block diagram of a node 300 of a network of nodes 302a, 302b, 302c, 302d, 302e, 302f in communication with a trusted third party 304. Although nodes do not exchange messages about their local read event data with each other, nodes can communicate other information with each other. For example, a node 302f might communicate the common key key that is shared by the nodes of the supply chain, but not by the service provider S, to node 300. The node 300 can include one or more tag readers 306 adapted for reading RFID information from an RFID tag that passes through the network of nodes, including node 300. The node 300 an also include transceiver circuitry 308 for receiving an antigen pattern (e.g., from the trusted third party 304) and for transmitting messages about local read events to the trusted third party. An antigen pattern 310 received from the trusted third party can be stored in a memory 312. The memory 312 also can store a key 314 for use in an encryption algorithm. A comparison engine 316 can compare local read events to events in the pattern of events 310 to determine whether a match between the two exists or not. An encryption engine 318 can then cryptographically encrypt messages indicating a match between a read event and an event in the pattern 310 and containing information about the position of the event in the trace for the item. The encrypted messages are transmitted through the transceiver circuitry 308 to S 304.

After receiving the pairs $\langle x_{\gamma,\delta}, \delta \rangle$, S can sort them according to their second value $\delta$, which corresponds to the position of the event in the antigen pattern p. Then, if there is any combination $\tau_1, \ldots, \tau_n$ of pairs $\langle x_{\tau_1}, 0 \rangle, \ldots, \langle x_{\tau_n}, n-1 \rangle$, such that $$\sum_{i=1}^{n} x_{\tau_i} = 0,$$

then S can determine that the pattern p matches the event trace t and can inform the parties that sent the pairs of values $\langle x_{\gamma,\delta}, \delta \rangle$ that were summed to equal zero that they have handled a potentially counterfeit item. If there is no combination $\tau_1, \ldots, \tau_n$ of pairs $\langle x_{\tau_1}, 0 \rangle, \ldots, \langle x_{\tau_n}, n-1 \rangle$, such that $$\sum_{i=1}^{n} x_{\tau_i} = 0,$$

then S determines only that a counterfeit item was not detected but S cannot determine which of the nodes handled the item.

Figure 4:
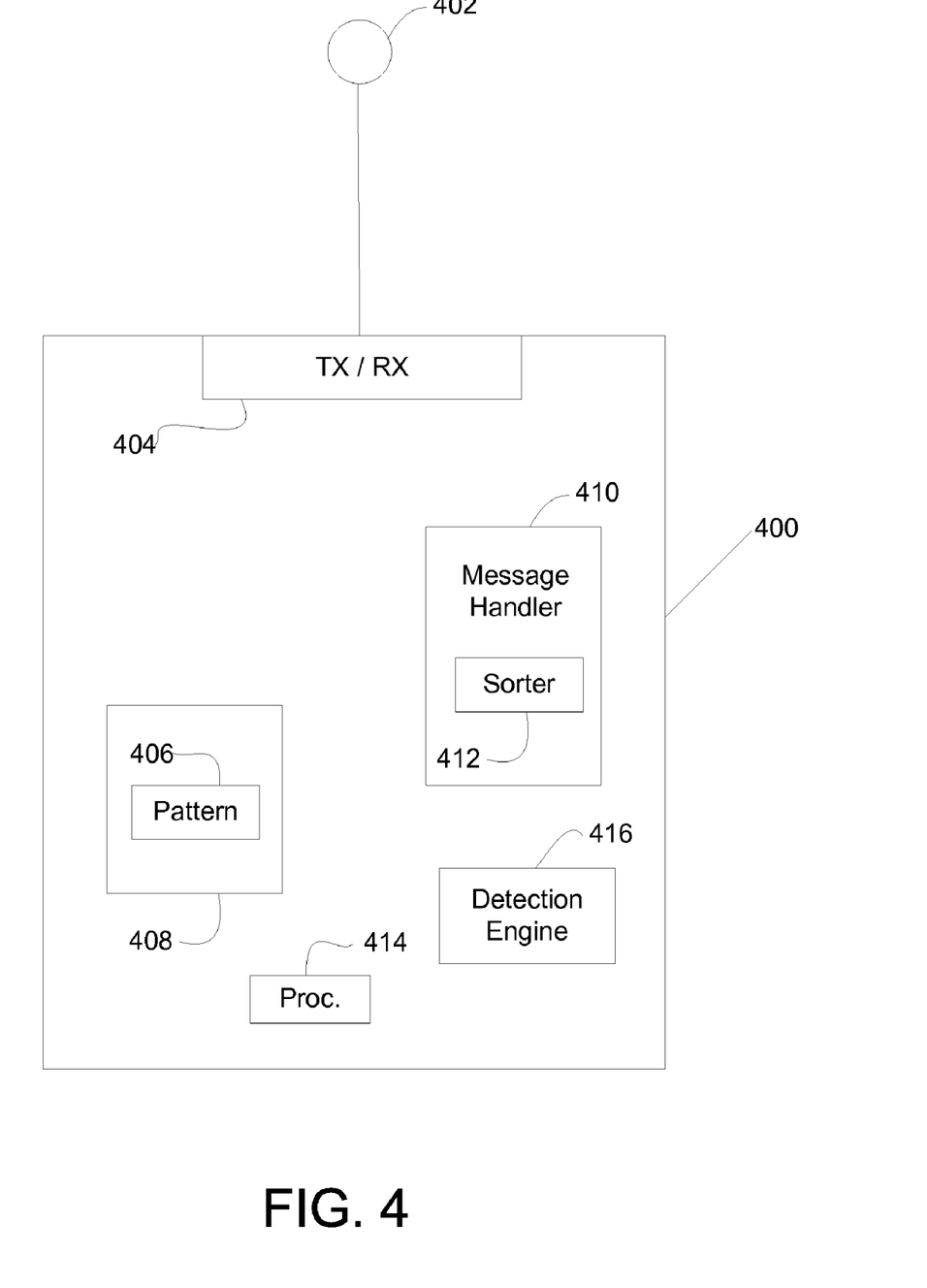
FIG. 4 is a schematic block diagram of a trusted third party in communication with a node of a network of nodes.

Thus, FIG. 4 is a schematic block diagram of a trusted third party 400 in communication with a node 402 of a network of nodes. The trusted third party 400 can include transceiver circuitry 404 for sending an antigen pattern to the node 402 and for receiving messages about local read events at the node from the node. Antigen patterns 406 can be stored in a memory 408 and transmitted to nodes of the network when needed.

A message handler 410 can receive messages from the transmission circuitry and process the messages for analysis. For example, the message handler 410 can include a sorting engine 412 that sorts pairs $\langle x_{\gamma,\delta}, \delta \rangle$, S according to their second value $\delta$. A processor 414 can execute a detection block 416 to analyze messages received from a plurality of nodes to determine, based on a sequence of $x_{\gamma,\delta}$ values, if a sequence of read events for the item matches the antigen pattern.

An example is shown in TABLE 1 below, in which there are event types x, y, z and the event trace for the queried RFID tag is y, x, y, z, which is shown in the second line of the table. The event trace is distributed over the nodes $X_1$, $X_2$, $X_3$. The antigen pattern p is y, z. The events, y, x, y, z, could represent, for example, manufacturing, shipping, manufacturing, and retailing, respectively, and the antigen pattern of y, z may represent that an item going directly from a manufacturing event to a retailing event, without experiencing an intermediate shipping event, is anomalous and indicative of a possible counterfeit. Each node determines whether it has any read events that match events in the antigen pattern p by sliding the pattern p across the event trace, and the pattern is depicted in the Table for positions $\gamma=1,2,3$. A bold, large font indicates a match between the antigen pattern p and a read event at a node.

TABLE 1

| | $X_1$ | $X_2$ | $X_2$ | $X_3$ |
|---|---|---|---|---|
| $\gamma$ | y | x | y | z |
| 1 | y | z | | |

TABLE 1-continued

|   | $X_1$ | $X_2$ | $X_2$ | $X_3$ |
|---|---|---|---|---|
| 2 |   | y | z |   |
| 3 |   |   | y | z |

Consider party $X_2$: it has events at positions 2 and 3 and needs to compare its events for pattern positions $\gamma=1,2,3$. Thus, $X_2$ computes the pairs $\langle x_{1,1}=r,1\rangle$, $\langle x_{2,0}=r',0\rangle$, $\langle x_{2,1}=r'',1\rangle$ and $\langle x_{3,0}=MAC(h.3.0,key),0\rangle$. Since the length of the pattern is equal or below the number of its consecutive events, and a match at positions inside its events can be determined by itself, but did not occur, $X_2$ can choose to omit the pairs for $\gamma=2$. Party $X_3$ has an event at position 4 and computes $\langle x_{3,1}=-MAC(h.3.0,key),1\rangle$. It holds that $x_{3,0}+x_{3,1}=0$, such that the anti-counterfeiting service provider can detect the match of the antigen pattern y, z with the observed sequence of read events y,x,y,z, based on the sum of $x_{3,0}+x_{3,1}=0$.

We can determine the bit-length of the MAC that is needed to prevent false positives from occurring. Let $\kappa$ be the bit-length of the MAC used above. Then, the anti-counterfeiting service provider S receives nlu pairs for each tag it checks using the algorithm above, where n is the length of the antigen pattern, l is the number of nodes in the supply chain, and u is a parameter used to determine how many random numbers a node will send in the absence of a match between event in the antigen pattern p and a read events e in the trace. It can then form $(lu)^n$ possible combinations of pairs, such that the following must hold $$(lu)^n \ll 2^\kappa$$

for false positives to be negligible.

In an example in which l=60, u=1 and n=2, then $\kappa \gg 11.8$. In this case we can save communication cost and even condense common MAC functions, such as HMAC (Hash-based Message Authentication Code) based on SHA-1 (Secure Hash Algorithm), by sending only the first 32 bits of the MAC value.

As the parties $X_k$ do not share data with each other, but only with the service provider S, there is no risk of revealing information to other supply chain participants. However, in the event that the anti-counterfeiting service provider S is the adversary and tries to infer the type of read events at some victim $X_*$, it can be seen that S cannot do so and does not obtain any additional knowledge about the events at $X_*$, because the cryptographic encoding of the messages sent from the nodes to S described above preserves the privacy of the events.

This can be understood by playing the following game: S sends some pattern p and a tag identifier h of its choice to all $X_k$ and receives the pairs $x_{\gamma,\delta}$, $\delta$ in return including $x_{\gamma^*,\delta^*}$, $\delta^*$ from $X_*$. We assume that the pattern p does not match the events of h beginning at position $\gamma^*$, since that would reveal $X_*$'s type from the result of the comparison. S is then asked to tell whether $x_{\gamma^*,\delta^*}$ is the MAC or a random number, i.e. whether or not $X_*$ has a matching event type at pattern position $\delta^*$. Note that, in case the fact that $X_*$ is sending messages does not leak any information, this security definition implies that S cannot even infer whether $X_*$ has any event for UID h and therefore had possession of the item. Then, we can define the following theorem:

Theorem 1 Let m be the maximum number of read events for any tag identifier. If any adversary S wins the game above with probability $\frac{1}{2}+\epsilon$, then there is an algorithm B that successfully commits MAC forgery with probability at least $\epsilon/m$.

The Theorem 1 can be proved as follows.

Proof. If S outputs random number, B outputs a random guess for the MAC pair. If S outputs MAC, B chooses a random starting position j ($j \notin \{0, \ldots, m-1\}$) for $\gamma^*$. S knows h and $\delta^*$ of $x_{\gamma^*,\delta^*}$ which is presumably MAC(h.$\gamma^*$.$\delta^*$,key). So, B outputs h·j·$\delta^*$, $x_{\gamma^*,\delta^*}$ as its guess for the MAC pair. Its chances of success are $\epsilon/m$ (which is independent of the bit-length $\kappa$ of the MAC).

So far we have assumed that each party $X_k$ is aware of the numbering of its read events, i.e. each party knows the j of its read events $e_j$. One method to achieve this is to store j on the RFID tag, so that after reading the tag and storing the event in its database $X_k$ updates j to j+1 on the tag.

However, as described above, a counterfeiter can employ various strategies, and an attacker can either use a valid UID (cloning or re-attaching) or an invalid one. Storing the numbering on the RFID tag opens new avenues when re-using a valid UID by only changing the numbering. Three different cases can be distinguished: the traces of the two items with the same UID that are identical, overlapping (but not identical), or non-overlapping. In case the traces are overlapping but not identical, the detection techniques described above can detect false transitions, and the case will be flagged as a counterfeit. In case the traces are identical, each party $X_k$ can detect a counterfeit by simply detecting the duplicate. It can either directly flag the product as counterfeit or signal a special event type $\hat{y}$ in the counterfeit detection. In case the traces are non-overlapping, they will appear as separate traces to our algorithm, and we need to detect the missing events between them. We describe techniques for doing so below.

In case of forged UIDs or forged numbering we must detect missing events in an antigen pattern. For example, the anti-counterfeiting service provider Scan send an antigen pattern p with event type $y_i=*$, which matches an event trace t at position $\beta$, if no $X_k$ has any event $e_{\beta+-1}$.

Recall that m is the maximum number of read events for any tag identifier and that $J_k$ is the set of found read events at $X_k$. Assume $p \cdot y_i=*$ and then we consider each position $\gamma \notin \{j|-n < j \leq m-i\}$. We compute $x^*_{\gamma,i,k}$ in the pairs, such that their sum over all nodes in the supply chain is $x_{\gamma,\delta}$ of a pair matching the pattern p, if no node has an event. If any node has an event, then it randomizes the sum by choosing a random number again. Each node $X_k (1 \leq k < l)$, i.e. everybody except $X_l$ computes $$x^*_{\gamma,i,k} = \begin{cases} MAC(h.\gamma.i.k, k) & \text{if } \gamma+i \notin J_k \\ r & \text{if } \gamma+i \notin J_k \end{cases},$$

where r is a uniform random number in the domain of the message authentication code.

The node $X_l$ can compute $x_{\gamma,i,l}^*$ according to the relationship:

$$x^*_{\gamma,i,k} = \begin{cases} -\sum_{k=1}^{l-1} MAC(h.\gamma.i.k, k) + MAC(h.\gamma.i, k) & \text{if } \gamma+i \notin J_k \\ r & \text{if } \gamma+i \notin J_k \end{cases},$$

Then all the nodes $X_k$, including $X_l$, send to S a random permutation of their pairs $x_{\gamma,i,k}$, i mixed with the pairs computed for the other pattern positions. The anti-counterfeiting service provider S builds all sums $$x_{\gamma,i} = \sum_{k=1}^{t} x^*_{\gamma,i,k}$$

and uses $x_{\gamma,i}$ in its detection algorithm.

Figure 5:
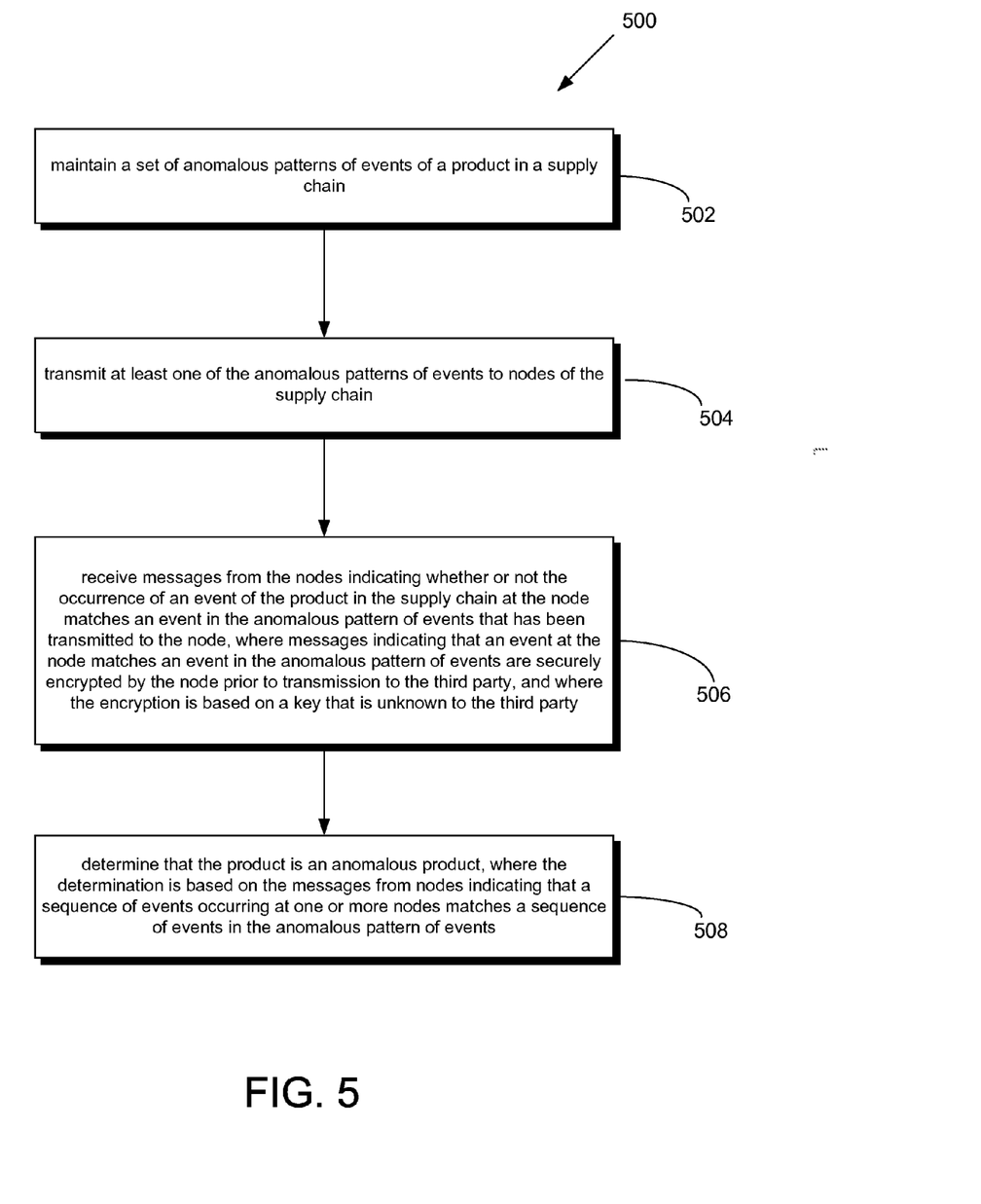
FIG. 5 is a schematic flow chart of a process of identifying an anomalous product in a supply chain.

FIG. 5 is a schematic flow chart of a process (500) of identifying an anomalous product in a supply chain. In a first step (502) a set of anomalous patterns of events of a product in the supply chain is maintained. For example, the anomalous patterns can be antigens that are generated using the AIS techniques described above, and the patterns can be maintained at a trusted third party or at another site. Then, at least one of the anomalous patterns of events is transmitted to nodes of the supply chain (504). For example, the trusted third party can transmit the pattern of events.

Messages are received at a third party from each of the nodes that have received the anomalous pattern, where the third party is not a node of the supply chain (506). The messages received at the trusted third party may indicate whether or not the occurrence of an event of the product in the supply chain at the node matches an event in the anomalous pattern of events that has been transmitted to the node. Further, the messages indicating that an event at the node matches an event in the anomalous pattern of events are securely encrypted by the node prior to transmission to the third party using a key that is unknown to the third party. Then, the third party determines whether the product is an anomalous product based on the messages from nodes indicating that a sequence of events at one or more nodes matches a sequence of events in the anomalous pattern of events (508).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., a FPGA or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. Thus, although the disclosure has focused on the detection of anomalous patterns for the application of detecting counterfeit items in a supply chain, the detection of anomalous patterns of items in a network of nodes has other applicability also. For example, comparison of a pattern in a network of nodes to antigen patterns can be used to detect an incorrect execution of business processes (e.g., a manufacturing process), which leads to anomalies that can be detected through comparison to a group of antigen patterns. In another example, comparison of patterns in a network of nodes to antigen patterns also can be used to distinguish authorized from unauthorized users in a certain setting. For example, users for sensitive equipment or information could be required to verify their credentials at a number of different sites in a particular timeframe or time sequence. Then, an unauthorized user, who presents forged or stolen credentials attempts to gain access to the sensitive equipment or information, but presents the forged or stolen credentials in an event sequence that matches an anomalous pattern, the unauthorized user can be detected. It is, therefore, to be understood that the appended claims are intended to cover all such modifications and changes as fall within the scope of the embodiments.

What is claimed is:

1. A computer-implemented method of identifying an anomalous product in a supply chain, the method comprising:
maintaining a set of anomalous patterns of events of a product in the supply chain;
transmitting at least one of the anomalous patterns of events to nodes of the supply chain;

receiving messages from nodes that have received the at least one pattern at a third party, wherein the third party is not a node of the supply chain, the messages indicating whether or not the occurrence of an event of the product in the supply chain at the node matches an event in the anomalous pattern of events that has been transmitted to the node, wherein messages indicating that an event at the node matches an event in the anomalous pattern of events are securely encrypted by the node prior to transmission to the third party, wherein the encryption is based on a key that is unknown to the third party; and determining, via at least one processor of the third party, that the product is an anomalous product, wherein the determination is based on the messages from nodes indicating that a sequence of events occurring at one or more nodes matches a sequence of events in the anomalous pattern of events.

2. The method of claim 1, further comprising generating at least some of the patterns of events, wherein the generation of an anomalous pattern of events includes:

determining possible patterns of events of a product in the supply chain;

comparing the possible patterns of events to a set of patterns that are known to be non-anomalous; and selecting possible patterns that do not match a pattern that is known to be non-anomalous for the set of anomalous patterns of events.

3. The method of claim 2, further comprising:
determining a pattern of events in the supply chain to be a non-anomalous pattern of events by:

receiving, at the third party, messages from nodes of the supply chain indicating a pattern of an actual product in the supply chain, wherein the pattern is known to be non-anomalous.

4. The method of claim 1, wherein the messages include information about an action performed on the product and the node that performs the action.

5. The method of claim 1, wherein messages received from a node are securely encrypted by applying a cryptographic hash function to information contained in the message, wherein the hash function uses a key known to each of the nodes of the supply chain.

6. The method of claim 5, wherein the key is not known by the third party.

7. The method of claim 1, wherein messages indicating that an event at the node does not match an event in the anomalous pattern of events contain random information.

8. The method of claim 1, wherein the messages received from a node indicating that the occurrence of an event of the product in the supply chain at the node matches an event in the anomalous pattern include cryptographically encrypted information about the position of the event in a sequence of events for the product in the supply chain and about the position of the event in the anomalous pattern of events that has been transmitted to the node and unencrypted information about the position of the event in the anomalous pattern of events.

9. The method of claim 8, further comprising:
sorting the received messages indicating that the occurrence of an event of the product in the supply chain at the node matches an event in the anomalous pattern by the information about the position of the event in the anomalous pattern of events; and determining whether a combination of information from the sorted messages indicates that a sequence of events for the product in the supply chain matches the anomalous pattern of events.

10. The method of claim 1, the messages received from a node include pairs of values, $\langle x_{\gamma,\delta}, \delta \rangle$ where:

$$x_{\gamma,\delta} = \begin{cases} f(h.\gamma.\delta, k) & \text{if } e_{y+\delta}.\gamma = p.\gamma_{\delta+1} \wedge \delta < n-1 \\ -\sum_{i=0}^{n-2} f(h.\gamma.i, k) & \text{if } e_{y+\delta}.\gamma = p.\gamma_{\delta+1} \wedge \delta = n-1 \\ r & \text{if } e_{y+\delta}.\gamma \neq p.\gamma_{\delta+1} \end{cases}$$

n is the number of events in the anomalous pattern,
p is the sequence of events in the anomalous pattern,
e·y is an event of a type, y, observed at the node,
h is a value of an identifier of the product,
γ is an index value for an event in a sequence of events for the product in the supply chain,
γ+δ is an index value for an event that occurs in a sequence of events δ steps in the sequence after an event having an index value of γ,
k is a key value that is unknown to the third party,
i is a summation index,
f is a cryptographic function, and
r is a random number in the domain of f.

11. The method of claim 10, wherein f is a cryptographic hash function.

12. The method of claim 10, wherein determining whether the product is an anomalous product based on the messages from nodes indicating that an event at the node matches an event in the anomalous pattern of events further comprises:

sorting received pairs of values by δ; and determining whether a combination of $x_{\gamma,\delta}$ values corresponding to sequentially sorted δ values yields a non-random result.

13. The method of claim 10, wherein the product includes a tag that stores updatable information about the value of γ.

14. A system for identifying an anomalous product in a supply chain, the system comprising:

a memory storing a set of anomalous patterns of events of a product in the supply chain;

a transmission engine configured for transmitting at least one of the anomalous patterns of events to nodes of the supply chain;

a message handler configured for receiving messages from nodes that have received the at least one pattern, the messages indicating whether or not the occurrence of an event of the product in the supply chain at the node that sends a message matches an event in the anomalous pattern of events that has been transmitted to the node, wherein messages indicating that an event at the node matches an event in the anomalous pattern of events are securely encrypted prior to receipt by the message handler, wherein the encryption is based on a key that is unknown to the system; and a processor configured to determine that the product is an anomalous product, wherein the determination is based on the messages from nodes indicating that a sequence of events occurring at one or more nodes matches a sequence of events in the anomalous pattern of events.

15. The system of claim 14, further comprising:
sorting the received messages indicating that the occurrence of an event of the product in the supply chain at the node matches an event in the anomalous pattern by the information about the position of the event in the anomalous pattern of events; and determining whether a combination of information from the sorted messages indicates that a sequence of events for the product in the supply chain matches the anomalous pattern of events.

16. The system of claim 14, wherein received from a node include pairs of values, $\langle x_{\gamma,\delta}, \delta \rangle$ where:

$$x_{\gamma,\delta} = \begin{cases} f(h.\gamma.\delta, k) & \text{if } e_{y+\delta}.\gamma = p.\gamma_{\delta+1} \wedge \delta < n-1 \\ -\sum_{i=0}^{n-2} f(h.\gamma.i, k) & \text{if } e_{y+\delta}.\gamma = p.\gamma_{\delta+1} \wedge \delta = n-1 \\ r & \text{if } e_{y+\delta}.\gamma \neq p.\gamma_{\delta+1} \end{cases},$$

n is the number of events in the anomalous pattern,
p is the sequence of events in the anomalous pattern,
e·y is an event of a type, y, observed at the node,
h is a value of an identifier of the product,
γ is an index value for an event in a sequence of events for the product in the supply chain,
γ+δ is an index value for an event that occurs in a sequence of events δ steps in the sequence after an event having an index value of γ,
k is a key value that is unknown to the system,
i is a summation index,
f is a cryptographic function, and
r is a random number in the domain of f.

17. The system of claim 16, wherein f is a cryptographic hash function.

18. The system of claim 16, wherein the processor is further configured to determine whether the product is an anomalous product based on the messages from nodes indicating that an event at the node matches an event in the anomalous pattern of events by:
  sorting received pairs of values by δ; and
  determining whether a combination of $x_{\gamma,\delta}$ values corresponding to sequentially sorted values yields a non-random result.

19. A system for identifying an anomalous pattern of events in a network of nodes, the system comprising:
  a memory storing a set of anomalous patterns of events in the network of nodes;
  a transmission engine configured for transmitting at least one of the anomalous patterns of events to nodes of the network of nodes;
  a message handler configured for receiving messages from each of the nodes at a third party that is not a node of the network, the messages indicating whether or not the occurrence of an events in the network at the node matches an event in the anomalous pattern that has been transmitted to the node, wherein messages indicating that an event at the node matches an event in the anomalous pattern of events are securely encrypted by the node prior to receipt by the message handler, wherein the encryption is based on a key that is unknown to the system, the messages received from a node including pairs of values, $\langle x_{\gamma,\delta}, \delta \rangle$ where:

$$x_{\gamma,\delta} = \begin{cases} f(h.\gamma.\delta, k) & \text{if } e_{y+\delta}.\gamma = p.\gamma_{\delta+1} \wedge \delta < n-1 \\ -\sum_{i=0}^{n-2} f(h.\gamma.i, k) & \text{if } e_{y+\delta}.\gamma = p.\gamma_{\delta+1} \wedge \delta = n-1 \\ r & \text{if } e_{y+\delta}.\gamma \neq p.\gamma_{\delta+1} \end{cases},$$

n is the number of events in the anomalous pattern,
p is the sequence of events in the anomalous pattern,
e·y is an event of a type, y, observed at the node,
h is a value of an identifier of a sequence of events,
γ is an index value for an event in a sequence of events in the network of nodes,
γ+δ is an index value for an event that occurs in a sequence of events δ steps in the sequence after an event having an index value of γ,
k is a key value that is unknown to the system,
i is a summation index,
f is a cryptographic function, and
r is a random number in the domain of f; and
a processor configured to identify an anomalous pattern of events in the network, wherein the determination is based on the messages from nodes indicating that a sequence of events occurring at one or more nodes matches a sequence of events in the anomalous pattern of events.

20. The system of claim 19, wherein the processor is further configured to determine whether a sequence of occurrences of events is an anomalous pattern based on the messages from nodes indicating that an event at the node matches an event in the anomalous pattern of events by:
  sorting received pairs of values by δ; and
  determining whether a combination of $x_{\gamma,\delta}$ values corresponding to sequentially sorted δ values yields a non-random result.

* * * * *